(12) United States Patent
Lindner et al.

(10) Patent No.: US 6,640,140 B1
(45) Date of Patent: Oct. 28, 2003

(54) PLC EXECUTIVE WITH INTEGRATED WEB SERVER

(75) Inventors: David T. Lindner, Nashua, NH (US); Andrew G. Swales, Windham, NH (US); Merrill W. Harriman, Nashua, NH (US); James W. McGlaughlin, III, Hudson, NH (US)

(73) Assignee: Schneider Automation Inc., North Andover, MA (US)

( * ) Notice: Subject to any disclaimer, the term of this patent is extended or adjusted under 35 U.S.C. 154(b) by 71 days.

(21) Appl. No.: 09/685,355

(22) Filed: Oct. 10, 2000

(51) Int. Cl.⁷ ............................................. G05B 11/01
(52) U.S. Cl. ........................... 700/18; 700/19; 700/23; 700/65; 700/66; 700/86; 700/87; 709/106; 709/107; 709/220; 709/221; 709/223
(58) Field of Search ................................. 700/9–13, 18, 700/19, 20, 23, 65, 66, 83, 86, 87; 709/106, 107, 220, 221, 223, 224, 225

(56) References Cited

U.S. PATENT DOCUMENTS

| | | | | |
|---|---|---|---|---|
| 5,406,473 A | * | 4/1995 | Yoshikura et al. | 700/20 |
| 5,420,977 A | * | 5/1995 | Sztipanovits et al. | 345/853 |
| 5,598,536 A | * | 1/1997 | Slaughter et al. | 709/219 |
| 5,613,115 A | * | 3/1997 | Gihl et al. | 717/123 |
| 5,805,442 A | * | 9/1998 | Crater et al. | 700/9 |
| 6,061,603 A | * | 5/2000 | Papadopoulos et al. | 700/83 |
| 6,151,625 A | * | 11/2000 | Swales et al. | 709/218 |
| 6,192,281 B1 | * | 2/2001 | Brown et al. | 700/2 |
| 6,282,454 B1 | * | 8/2001 | Papadopoulos et al. | 700/83 |
| 6,308,231 B1 | * | 10/2001 | Galecki et al. | 710/72 |
| 6,321,272 B1 | * | 11/2001 | Swales | 709/250 |
| 6,330,525 B1 | * | 12/2001 | Hays et al. | 702/183 |
| 6,484,061 B2 | * | 11/2002 | Papadopoulos et al. | 700/83 |

* cited by examiner

Primary Examiner—Ramesh Patel
(74) Attorney, Agent, or Firm—Michael J. Femal; Larry I. Golden

(57) ABSTRACT

A programmable logic controller for use as part of an industrial control system or as part of an automated system and a corresponding method, the controller including an interface to the Internet, and including a web server allowing a remote computer to access web pages maintained by the controller providing information relevant to the control function of the controller such as control sensor readings and, optionally, information about the status of the control system. The web server is implemented as part of the controller in such a way that the controller scan rate (the rate at which the ladder logic for all associated control system devices is repeated) is unaffected by execution of the web server.

20 Claims, 2 Drawing Sheets

PLC EXECUTIVE WITH INTEGRATED WEB SERVER

FIELD OF THE INVENTION

The present invention pertains to the field of industrial control or automation. More particularly, the present invention pertains to communication over a network between a programmable logic controller (PLC) for performing a control function relevant to an industrial control or automated system and a computer used for monitoring data associated with the control function and for monitoring control system information in general.

BACKGROUND OF THE INVENTION

An industrial control system often includes a programmable logic controller (PLC) for providing coordinated control of industrial control equipment, which includes various elements, that are often either sensors for providing inputs to the PLC or relays for receiving outputs from the PLC, each under the control of an element controller, and each connected to the PLC over a network via a network I/O device. Industrial control using a PLC requires what is termed rapid scanning, meaning the continuous, rapid execution by the PLC of three main steps executed repeatedly: the acquiring of the status of each input to the PLC needed to execute so-called ladder logic for the process being controlled, the solving of the ladder logic to determine each output, and the updating of the status of the outputs.

The term ladder logic is used to indicate, in a form recognizable to early workers in the field of machine control, the expression of how the control elements of an industrial control system are to be controlled based on the monitoring elements of the industrial control system. The term ladder is used because the expression of the control logic is actually often in the form of a ladder, with each rung of the ladder having an output, i.e. a value for the required state of a control element, and one or more inputs, i.e. values corresponding to signals from monitoring elements.

For effective industrial control, a PLC must perform its scan of the connected I/O devices at a constant scan rate, never becoming so involved in peripheral tasks as to depart from its regularly scheduled monitoring of the I/O devices.

Ordinarily, process operation is monitored, at least intermittently, by supervisory personnel by means of one or more central management stations. Each station samples the status of PLCs (and their associated sensors) selected by the operator and presents the data in some meaningful format. The management station may or may not be located on the same site as the monitored equipment; frequently, one central station has access to multiple sites (whether or not these perform related processes). Accordingly, communication linkage can be vital even in traditional industrial environments where process equipment is physically proximate, since at least some supervisory personnel may not be.

To facilitate the necessary communication, the PLCs and related monitoring stations are connected by a computer network. Typically, a network is organized such that any computer may communicate with any other network computer. The communication protocol provides a mechanism by which messages can be decomposed and routed to a destination computer identified by some form of address. The protocol may place a "header" of routing information on each component of a message that specifies source and destination addresses, and identifies the component to facilitate later reconstruction of the entire message by the destination computer. This approach to data transfer permits the network to rapidly and efficiently handle large communication volumes without reducing transfer speed in order to accommodate long individual messages, or requiring every network computer to process every network message. The degree of routing depends on the size of the network. Each computer of a local network typically examines the header of every message to detect matches to that computer's identifier; multiple-network systems use routing information to first direct message components to the proper network.

PLCs have been interconnected by means of computer networks for some time; see, e.g., U.S. Pat. No. 5,307,463. In typical systems, a monitoring computer, which may be remotely located from any or all of the PLCs to which it has access, periodically queries the PLCs to obtain data descriptive of the controlled process or machine, or the PLC itself. These data are then available for analysis by the monitoring computer.

U.S. Pat. No. 5,805,442 discloses what is called a distributed interface that allows a remote computer to obtain information from a PLC over the Internet, the information obtained from the PLC including both data and instructions as to how to display the data (the terminology "distributed interface" thus being used because at least some of the instructions for displaying data from PLCs are located at the PLCs, not at the remote computer, and communicated to the remote computer with the data to be displayed). The PLC disclosed therein incorporates a web server, i.e. a module that responds to a request for data received over the Internet by providing the data as well as the instructions for displaying the data, the combination of data and display instructions residing on one or another PLC storage device as a so-called web page. What is not disclosed, however, is logic by which the PLC can keep a constant scan rate of its attached I/O devices.

What is needed is a way to incorporate a web server in a PLC in such a way that the PLC scan rate is not affected by the web server responding to requests by a remote computer for data from the PLC.

SUMMARY OF THE INVENTION

Accordingly, the present invention provides a controller as part of an industrial control or automated system and a corresponding method, the controller for controlling one or more input/output devices, the controller capable of interacting with a remotely located computer via a network, such as the Internet, the controller including: means for executing a controller scan (including solving ladder logic associated with the input/output devices, the controller scan having a predetermined scan rate; a web server for gathering data relevant to a control function, the web pages comprising data and associated instructions retrievable and executable by the remotely located computer, the instructions causing the remotely located computer to present the data for display in a predetermined format; wherein in response to a request for data, the web server provides one or more web pages in which the requested data are display.

In a further aspect of the invention, the means for gathering data executes as a background task.

In another, further aspect of the invention, the means for gathering data executes in parallel with the means for executing the controller scan.

In yet another, further aspect of the invention, in response to a request for data from the remote computer, the means for gathering data provides no more than a predetermined maximum number of bytes of combined data and instructions per scan by the means for executing the controller scan. In some applications according to this further aspect of the invention, the maximum number of bytes per scan is predetermined to be a number of bytes that can be communicated to the network for delivery to the remote computer in less than the time required for one scan by the means for executing the controller scan.

In still yet another, further aspect of the invention, at least some of the data are resident on a different controller, the data-gathering means being configured to access and obtain the data from the different controller via a computer network.

In still yet even another, further aspect of the invention, the controller further comprises a transmission control program (TCP)/ Internet protocol (IP) stack customized to communicate any MODBUS command or message as a single TCP/IP packet. In some applications according to this further aspect of the invention, the web server comprises a file server for providing the web pages, a hypertext transfer protocol (HTTP) server providing file get functionality, and also in some applications a file transfer protocol (FTP) server for receiving new or replacement web pages over the network via the TCP/IP stack and provides them to the file server.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
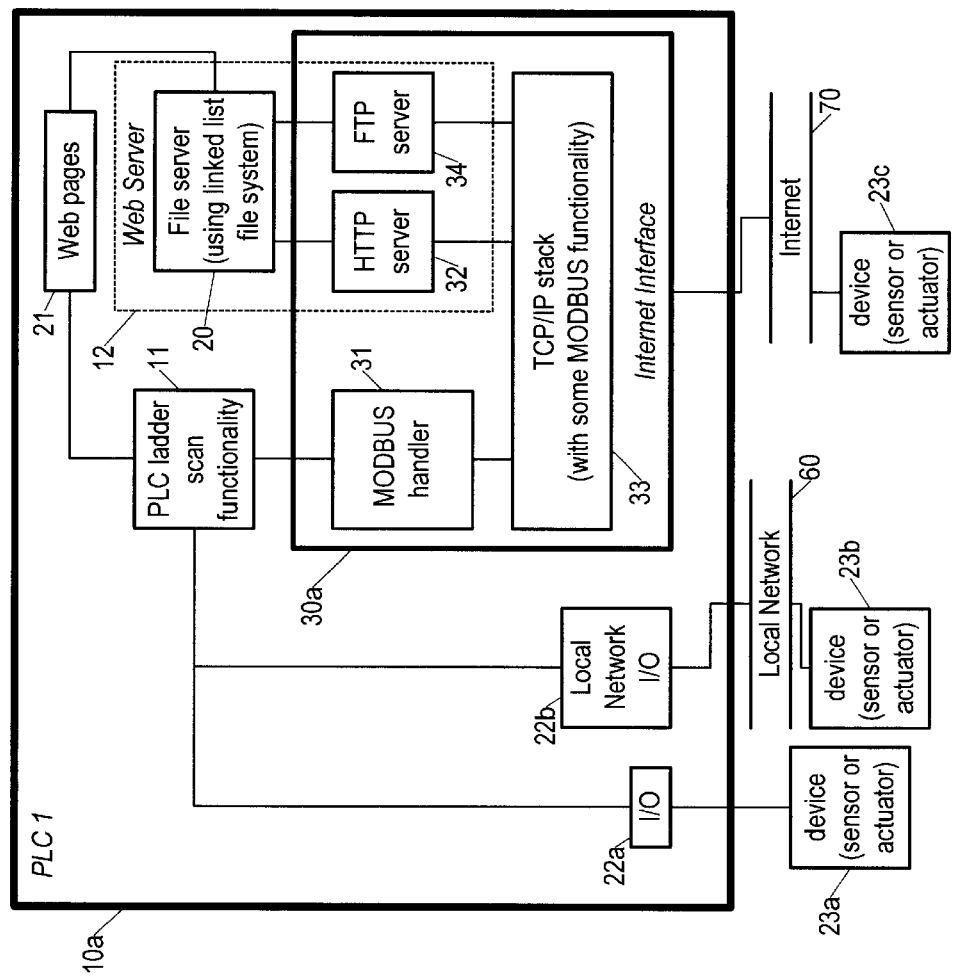
FIG. 1 is a block diagram showing various logical components of a PLC with an integrated web server according to the present invention.

Referring now to FIG. 1, a programmable logic controller (PLC) 10a for use as part of an industrial control system or part of an automated system, hereinafter called simply a controller, includes according to the present invention a module 11 having ladder scanned scan functionality, and a web server module 12. The module 11 having ladder scan functionality services I/O modules 22 connected to devices 23 that are either sensors or actuators, solving so-called ladder logic to determine outputs commanding the next state of each associated device based on all inputs for that device. The devices that are controlled by the PLC can be attached to the controller either directly (as is the device 23a), by a local network 60 (as is the device 23b), or by the Internet 70 (as is the device 23c). In the case of the device 22c connected to the controller 10a via the Internet 70, the controller uses an Internet interface 30a to process input and output associated with the device 22d. The network interface includes a MODBUS handler 31 on top of a transmission control program (TCP)/Internet protocol (IP) stack 33 having some MODBUS functionality and providing for communication over the Internet according to TCP/IP.

The terminology MODBUS refers here to a family of simple, vendor-neutral communication protocols intended for supervision and control of automating equipment. In the preferred embodiment, the TCP/IP stack is MODBUS/TCP compliant. MODBUS/TCP is a member of the family of MODBUS protocols; it covers the use of MODBUS messaging in an 'Intranet' or 'Internet' environment using the TCP/IP protocols. The most common uses of the TCP/IP protocols at this time are for Ethernet attachment of controllers, I/O modules, and 'gateways' to other simple field buses or I/O networks. Any firmware of the Internet interface 30a is preferably based on MODBUS TCP/IP, as defined by the Open MODBUS/TCP specification, release 1.0, and hereby incorporated by reference. The specification defines how MODBUS commands and responses are delivered over the Internet to and from a MODBUS server using the well known port 502.

In the preferred embodiment, the TCP/IP stack 33 is a custom stack; it is programmed to provide any MODBUS command or message as a single packet, optimizing all MODBUS communications.

The web server 12 includes both a file server 20, which preferably uses a linked list file system and a so-called HTTP server 32, i.e. a module for communicating hypertext (used to describe a web page to a browser so that the browser can display the web page) according to the Internet hypertext transfer protocol HTTP. In one embodiment, the HTTP server 32 has minimal functionality, such as only "file get" functionality. In the preferred embodiment, the web server 12 also includes a file transfer protocol (FTP) server 34 that accepts downloads of new or replacement web pages and provides them to the file server 20.

The TCP/IP stack 33 determines whether an incoming message (TCP/IP packet) is for the MODBUS handler 31, the HTTP server 32, or the FTP server 34 based on the port number specified in the incoming message.

Figure 2:
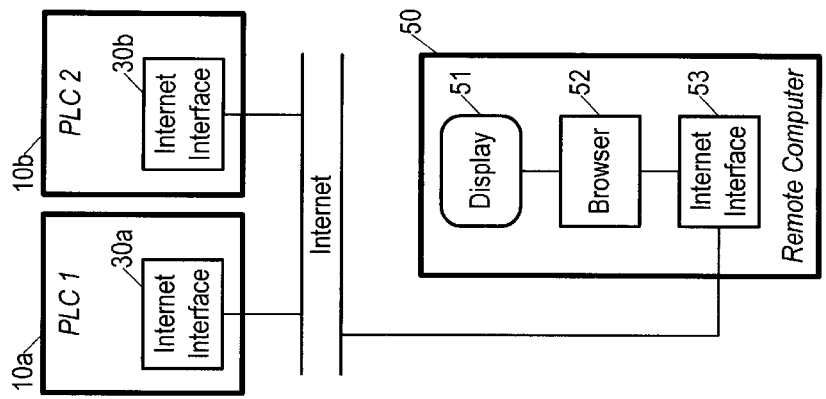
FIG. 2 is a block diagram showing several PLCs communicating data to a remote computer.

Referring now to FIG. 2, when a user of a remote computer 50 uses a browser 52 having a graphical user interface displayed on display 51 to communicate over the Internet 70 via a network interface 53 with the controller 10a via its Internet interface 30a, the controller acts as a website server for the browser 52, and through its HTTP server 32 and file server 20, the controller 10a will communicate to the browser 52 web pages 21 it stores on a storage device. The web pages include both data provided by the module 11 having controller ladder scan functionality as well as instructions for how the browser 52 is to display the data. In general, the web pages 21 can include data not only from devices attached directly or indirectly to the host controller 10a, but also data provided by other controllers. Thus, a first controller 10a can include on its web pages data provided by a second controller 10b, the data provided by the second controller being for example data associated with devices that are attached directly or indirectly to the second controller. The web pages can include the data from other controllers either as embedded data, or as a reference to a location of data on another controller, a reference that is comprehensible to the browser 52 so that when the browser loads a web page with such a reference the browser will proceed to obtain the referenced data from the other controller.

Figure 3:
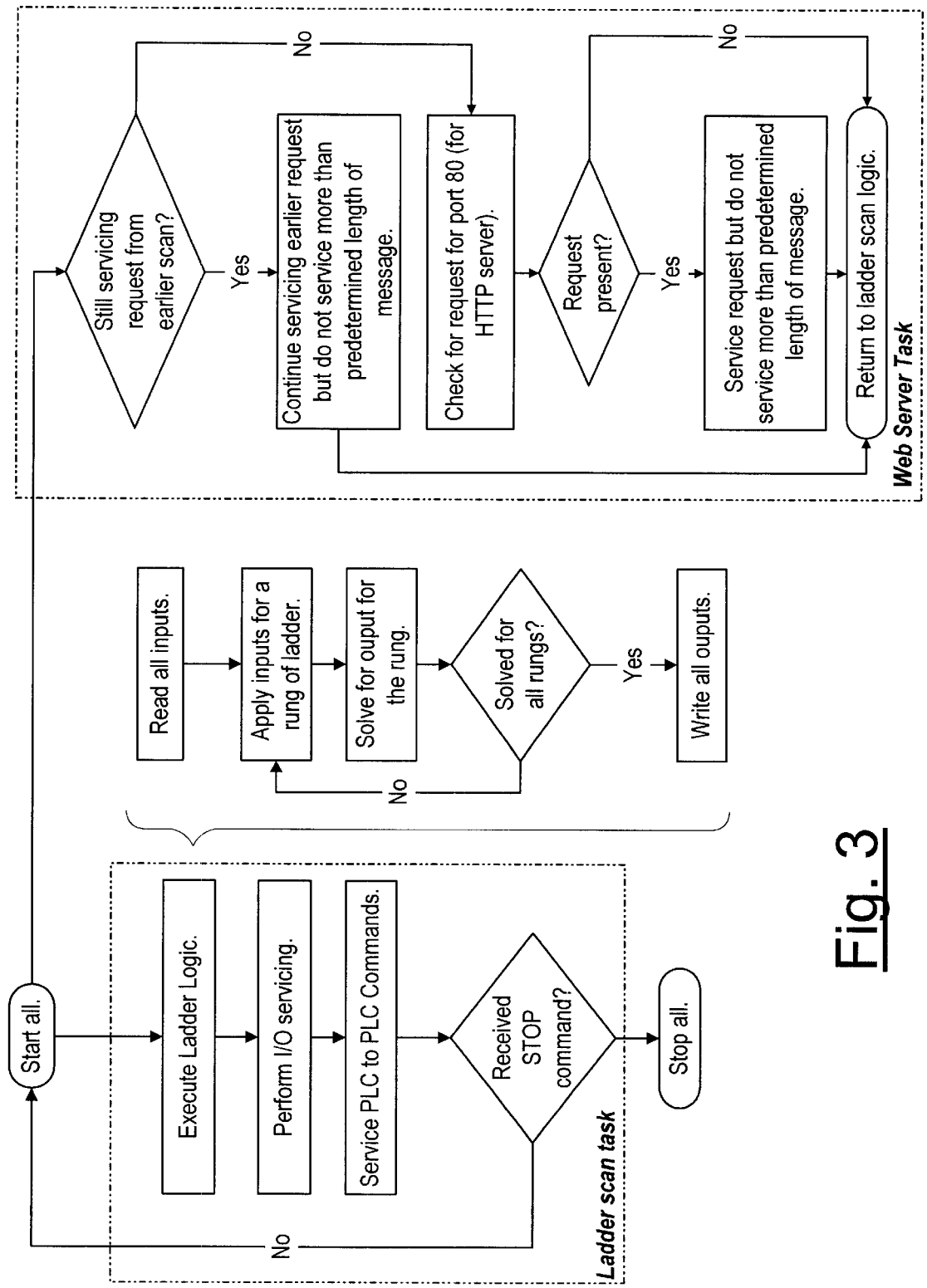
FIG. 3 is a flow chart showing the main steps in the routine operation of a PLC with an integrated web server, according to the present invention.

Referring now to FIG. 3, according to the present invention, the ladder scan task performed by the module 11 having ladder scan functionality and the web server task performed by the web server 12 are executed as parallel threads of the controller 10a in a single central processing unit (CPU). The phraseology parallel threads is intended here to indicate that a single central processing unit (CPU) executes the ladder scan task either in parallel with the web server task if the CPU has parallel processing capability, or, in the case of a standard sequential processing CPU, the CPU executes the web server a small fraction of any given time slice compared to the fraction of the same time slice devoted to executing the ladder scan task, i.e. the web server is executed as a background task.

As indicated in FIG. 3, the ladder scan task includes the steps of executing the ladder logic, performing input output servicing for each attached device, and servicing any controller to controller commands. These three tasks are repeated again and again at what is here called a scan rate, and according to the present invention this scan rate is not affected by the execution of the web server task. As indicated in FIG. 3, the web server task includes checking for a request for port 80 (a request for the HTTP server), and if a request is present, then servicing the request, but not servicing the request for more than a predetermined length of message. The predetermined length of message is such that the background task can service a message of the predetermined length in less than the time required for the CPU to complete a single ladder scan. If a message is longer than the predetermined length, then the web server will service some of the message in one scan and some of the message in a subsequent scan. Thus, determinism of the ladder scan task is maintained, i.e. the scan rate for the ladder scan is unaffected by execution of the integrated web server.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A controller for use as part of an industrial control system or as part of an automated system, the controller for controlling at least one input/output device, the controller capable of interacting with a remotely located computer via a network, the controller comprising:
    a) means for executing a controller scan including solving ladder logic associated with the at least one controlled input/output device, the controller scan having a predetermined scan rate;
    b) a web server for gathering data relevant to a control function, the web server being responsive to a request for the data from the remotely located computer; and
    c) web pages comprising data and associated instructions retrievable and executable by the remotely located computer, the instructions causing the remotely located computer to present the data for display in a predetermined format;
        wherein in response to a request for data, the web server provides one or more web pages in which the requested data are displayed, and further wherein the web server and the means for executing a controller scan are hosted by a same programmable logic controller device.

2. The controller of claim 1 wherein the web server executes as a background task.

3. The controller of claim 1 wherein the web server executes in parallel with the means for executing the controller scan.

4. The controller of claim 1 wherein in response to a request for data from the remote computer, the web server provides no more than a predetermined maximum number of bytes of combined data and instructions per scan by the means for executing the controller scan.

5. The controller of claim 4, wherein the maximum number of bytes per scan is predetermined to be a number of bytes that can be communicated to the network for delivery to the remote computer in less than the time required for one scan by the means for executing the controller scan.

6. The controller of claim 1, wherein at least some of the data are resident on a different controller, the data-gathering means being configured to access and obtain the data from the different controller via a computer network.

7. The controller of claim 1, wherein the controller further comprises a transmission control program (TCP)/Internet protocol (IP) stack customized to communicate any MODBUS command or message as a single TCP/IP packet.

8. The controller of claim 7, wherein the web server comprises a file server for providing the web pages.

9. The controller of claim 8, wherein the web server further comprises a hypertext transfer protocol (HTTP) server providing file get functionality.

10. The controller of claim 9, wherein the web server further comprises a file transfer protocol (FTP) server for receiving new or replacement web pages over the network via the TCP/IP stack and provides them to the file server.

11. The controller of claim 7, wherein the means for executing the controller scan is coupled to a MODBUS handler, which in turn is interfaced to the TCP/IP stack, thereby coupling the means for executing a controller scan to the network.

12. The controller of claim 7, wherein the means for executing the controller scan is coupled to a local network input/output interface thereby coupling the means for executing the controller scan to a local network.

13. The controller of claim 1, further wherein the web server checks for a request for the data, and if a request is present, then the web server services the request, but does not service the request for more than a predetermined length of message, the predetermined length of message such that the web server is able to service a message of the predetermined length in less time than is required for a single controller scan, thereby maintaining the predetermined scan rate as the rate of scanning.

14. A method of controlling at least one input/output device of an industrial control system or automated system and of interacting with a remotely located computer via a network, the method comprising the steps of:
    a) executing a controller scan including solving ladder logic associated with the at least one controlled input/output device, the controller scan having a predetermined scan rate;
    b) gathering data relevant to a control function;
    c) storing web pages comprising data and associated instructions retrievable and executable by the remotely located computer, the instructions causing the remotely located computer to present the data for display in a predetermined format;
    d) checking for a request for the data; and
    e) if a request for the data is present, then responding to a request for the data from the remotely located computer by providing one or more of the web pages used to display the requested data;
wherein all of the steps are performed according to instructions hosted by a same programmable logic controller device.

15. The method of claim 14, wherein the step of gathering data and the step of responding to a request for the data are executed as background tasks.

16. The method of claim 14, wherein the step of gathering data and the step of responding to a request for the data execute in parallel with the step of executing the controller scan.

17. The method of claim 14, wherein in responding to a request for data from the remote computer, no more than a predetermined maximum number of bytes of combined data and instructions per scan are provided.

18. The method of claim 17, wherein the maximum number of bytes per scan is predetermined to be a number of bytes that can be communicated to the network for delivery to the remote computer in less than the time required for one scan.

19. The method of claim 14, further comprising the step of communicating over the network MODBUS commands or messages, wherein any MODBUS command or message is communicated over the network as a single TCP/IP packet.

20. The method of claim 14, wherein in responding to a request for the data, the request is serviced, but it is not serviced for more than a predetermined length of message, the predetermined length of message such that the a message of the predetermined length is able to be serviced in less time than is required for a single controller scan, thereby maintaining the predetermined scan rate as the rate of scanning.

* * * * *